United States Patent
Wu et al.

(10) Patent No.: US 8,780,318 B2
(45) Date of Patent: Jul. 15, 2014

(54) PATTERNED PHASE RETARDATION FILM AND THE METHOD FOR MANUFACTURING THE SAME

(75) Inventors: Lung-Hai Wu, Taoyuan County (TW); Chen-Kuan Kuo, New Taipei (TW); Fung-Hsu Wu, Taoyuan County (TW); Cyun-Tai Hong, New Taipei (TW); Chih-Haw Wang, New Taipei (TW)

(73) Assignee: BenQ Materials Corporation, Taoyuan County (TW)

( * ) Notice: Subject to any disclaimer, the term of this patent is extended or adjusted under 35 U.S.C. 154(b) by 152 days.

(21) Appl. No.: 13/477,039

(22) Filed: May 21, 2012

(65) Prior Publication Data
US 2013/0107194 A1 May 2, 2013

(30) Foreign Application Priority Data
Oct. 27, 2011 (TW) .............................. 100139169 A

(51) Int. Cl.
G02F 1/13 (2006.01)
G02F 1/1335 (2006.01)
G02F 1/1337 (2006.01)
G02B 5/30 (2006.01)
B05D 5/06 (2006.01)
B05D 3/06 (2006.01)

(52) U.S. Cl.
CPC .. *B05D 3/06* (2013.01); *G02B 5/30* (2013.01); *B05D 5/06* (2013.01); *G02B 5/3083* (2013.01)
USPC ............................ 349/193; 349/117; 349/126

(58) Field of Classification Search
USPC .................. 349/193, 194, 117, 118, 119, 126
See application file for complete search history.

(56) References Cited

U.S. PATENT DOCUMENTS

| | | | |
|---|---|---|---|
| 6,498,679 B2 | 12/2002 | Lee et al. | |
| 6,624,863 B1 | 9/2003 | Jacobs et al. | |
| 8,493,520 B2 * | 7/2013 | Gay et al. | 349/15 |
| 8,520,174 B2 * | 8/2013 | Huang et al. | 349/117 |
| 2010/0073604 A1 * | 3/2010 | Okuyama et al. | 349/75 |
| 2012/0314181 A1 * | 12/2012 | Wu et al. | 349/201 |

* cited by examiner

*Primary Examiner* — Dennis Y Kim
(74) *Attorney, Agent, or Firm* — CKC & Partners Co., Ltd.

(57) ABSTRACT

A patterned phase retardation film is disclosed, which includes substrate, a phase retardation layer on the substrate comprising a plurality of first regions of liquid crystal materials and a plurality of second regions of curable resin, wherein the first regions and the second regions are in a grating stripe structure which is parallel and interleaved with each other the top part of the second regions is formed with at least one inclined plane; and a planarization layer for planarizing the phase retardation layer; wherein the first regions provide a first phase retardation and second regions provide a second phase retardation, the first phase retardation and the second phase retardation have a phase difference of 180°. The method for manufacturing the patterned phase retardation film is also disclosed.

9 Claims, 4 Drawing Sheets

PATTERNED PHASE RETARDATION FILM AND THE METHOD FOR MANUFACTURING THE SAME

RELATED APPLICATION

This application claims the priority benefit of Taiwan application serial no. 100139169, filed on Oct. 27, 2011, the full disclosure of which is incorporated herein by reference.

BACKGROUND OF THE INVENTION

1. Field of the Invention

The invention relates in general to a patterned phase retardation film and a method for manufacturing the same, and more particularly to a patterned phase retardation film and an embossing method for manufacturing the same.

2. Description of Related Art

It is known that, with a patterned phase retardation film to a liquid crystal display, a three-dimensional stereo imaging can thus be provided for a viewer wearing a polarization glasses. Approaches have been disclosed for manufacturing the patterned phase retardation film.

Some methods for manufacturing patterned phase retardation films are provided in the related art with more or less defects, such as a method of making a patterned phase retardation film disclosed in U.S. Pat. No. 6,624,863 disclosures; a micro-retarder plate using a plate with phase retardation disclosed in U.S. Pat. No. 6,498,679 describes.

The present invention intends to provide a novel and improved method for manufacturing patterned phase retardation film with an embossing treatment.

SUMMARY OF THE INVENTION

According to an aspect of the present invention, a patterned phase retardation film is provided. The patterned phase retardation film comprises a base substrate; a phase retardation layer disposed on the base substrate with a plurality of first regions of liquid crystal material and a plurality of second regions of curable resin, wherein the first regions and the second regions are in a grating stripe structure; the first regions are substantially interlaced and parallel to the second regions and the second regions have a top surface with at least one inclined plane; and a planarization layer for planarizing the phase retardation layer, wherein the first regions provide a first phase retardation and the second regions provide a second phase retardation, the first phase retardation and the second phase retardation has a phase difference of 180°.

According to another aspect of the present invention, a method for manufacturing a patterned phase retardation film is provided. The method for manufacturing a patterned phase retardation film comprises the following steps. A base substrate is provided. A curable resin is coated on the base substrate. The curable resin is then embossed with a predetermined pattern to form a pattern configuration having of a plurality of first regions and a plurality of second regions, wherein the first regions and the second regions are in a grating stripe structure. Each of the first regions relative to the second regions forms a grooved structure and parallel to each other. The second region is formed with at least one inclined plane. The pattern configuration is then cured and an alignment layer is formed on the first regions of the pattern configuration. A liquid crystal material is coated on the alignment layer on the patterned configuration, and the liquid crystal on the first regions are aligned with the alignment layer thereon to form a plurality of first phase retardation regions. The plurality of first phase retardation regions and the second regions forms a phase retardation layer. The phase retardation layer is planarized by the planarization layer wherein the first regions provide a first phase retardation and the second regions provide a second phase retardation, the first phase retardation and the second phase retardation has a phase difference of 180°.

The top surface of the second region in an embodiment of the present invention is formed with at least one inclined plane to avoid liquid crystal material remaining thereon to cause the crosstalking effect between the first regions and second regions. In an embodiment of this invention, the angle of at least one inclined plane of the top surface of the second region with the horizontal is in the range of 5° to 15°, and preferably is at 10°. In another embodiment of the invention, the top surface is consisted of two inclined planes and the angle of each of the inclined plane with the horizontal is in the range of 5° to 15°.

In a preferred embodiment of the invention, the phase retardation film is planarized by a planarization layer, such as pressure sensitive adhesives. For using of the pressure sensitive adhesive as the planarization layer, the patterned phase retardation film of the invention can be laminated directly with a release film or other optical films for simplified process.

According to yet another embodiment of the invention, the patterned phase retardation film further comprising of at least one functional optical film adhered thereon, such as a hard-coating film, a low reflective film, an anti-reflective film and an anti-glare film.

According to further another embodiment of the invention, the patterned phase retardation is provided by the manufacturing method mentioned above.

According to further another embodiment of the invention, the patterned phase retardation film is adhered to a display panel to provide stereo images for audience.

The above and other aspects of the invention will better be understood with regard to the following detail description of the preferred but non-limiting embodiment(s). The following description is made with reference to the accompanying drawings.

DETAILED DESCRIPTION

It is noteworthy that the drawings shown in the Figures are for illustrative purpose only and may be not scaled.

Figure 1:
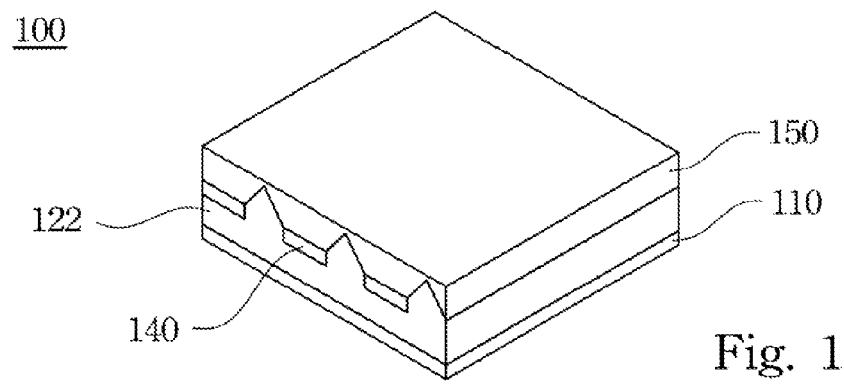
FIG. 1 shows a 3D schematic diagram of a patterned phase retardation film 100 of a preferred embodiment of the present invention.
Figure 2:
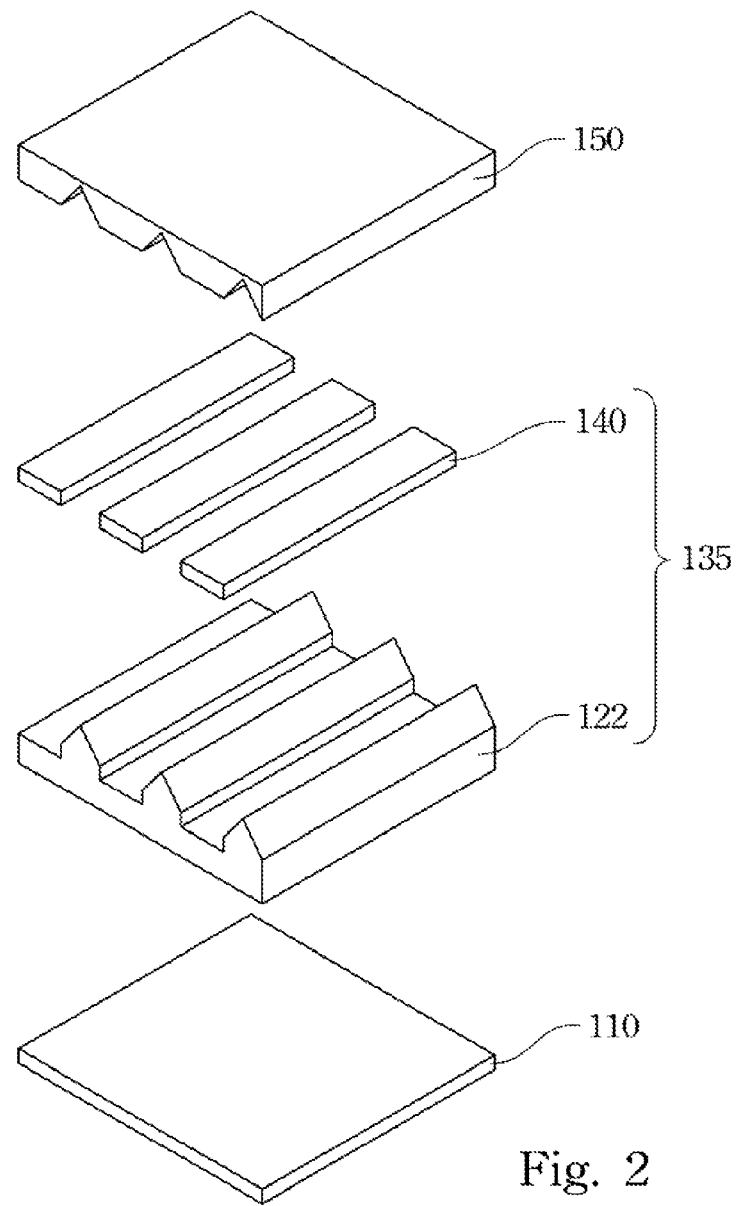
FIG. 2 shows an exploded view of the patterned phase retardation film 100 of FIG. 1.
Figure 2A:
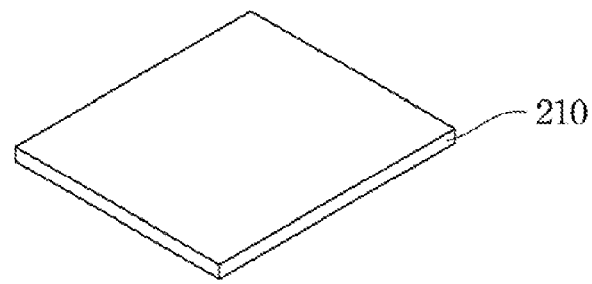
FIGS. 2A to 2E show a schematic diagram for a manufacturing method of a preferred embodiment of the present invention.

Referring to FIG. 1, a 3D schematic diagram of a patterned phase retardation film 100 of a preferred embodiment of the invention is shown. An exploded view of the patterned phase retardation film 100 of FIG. 1 is shown in FIG. 2. The patterned phase retardation film 100 comprises a base substrate 110, a phase retardation layer 135 and a planarization layer 150. The phase retardation layer 135 comprises a plurality of first regions 140 of liquid crystal material and a plurality of second regions 122 of curable resin wherein the arrangement of the first regions 140 and the second regions 122 are in a grating-like stripe structures, the first regions 140 are substantially interlaced and parallel to the second regions 122. The top surface of the second region is formed with at least one inclined plane. The first regions provide a first phase retardation and the second regions provide a second phase retardation, the first phase retardation and the second phase retardation have a phase difference of 180°.

Referring to FIGS. 2A to 2E, schematic diagrams for a manufacturing method of a preferred embodiment of the present invention are shown. The base substrate 210 is provided and the phase retardation of that is less than 90°. Preferably, the phase retardation of the base substrate 210 is substantially 0°. The base substrate 210 of the invention can be a polyethylene terephthalate (PET), polycarbonate (PC), triacetyl cellulose (TAC), polymethylmethacrylate (PMMA) or cycle-olefin polymer (COP). The thickness of the base substrate 210 is in the range of 1 microns (μM) to 3 microns.

Figure 2B:
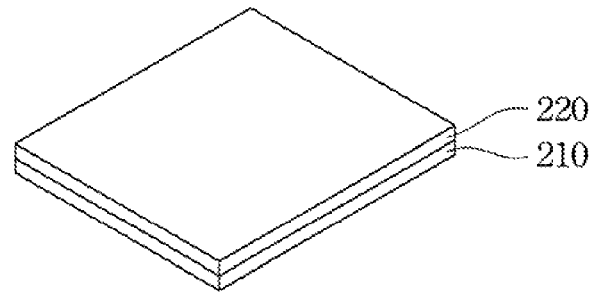
Figures 1, 2C:
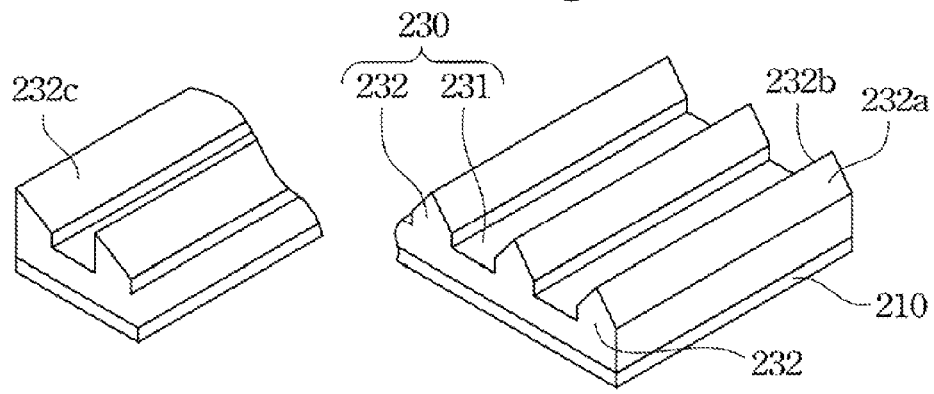
Figure 2D:
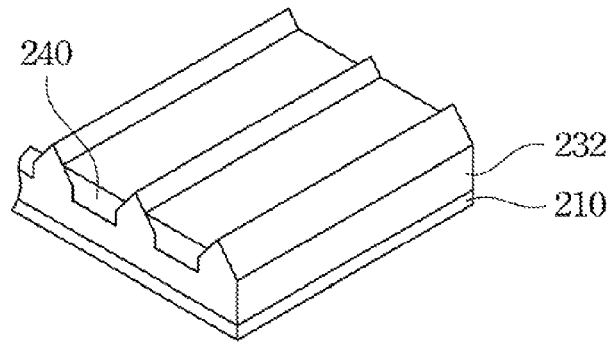
Figure 2E:
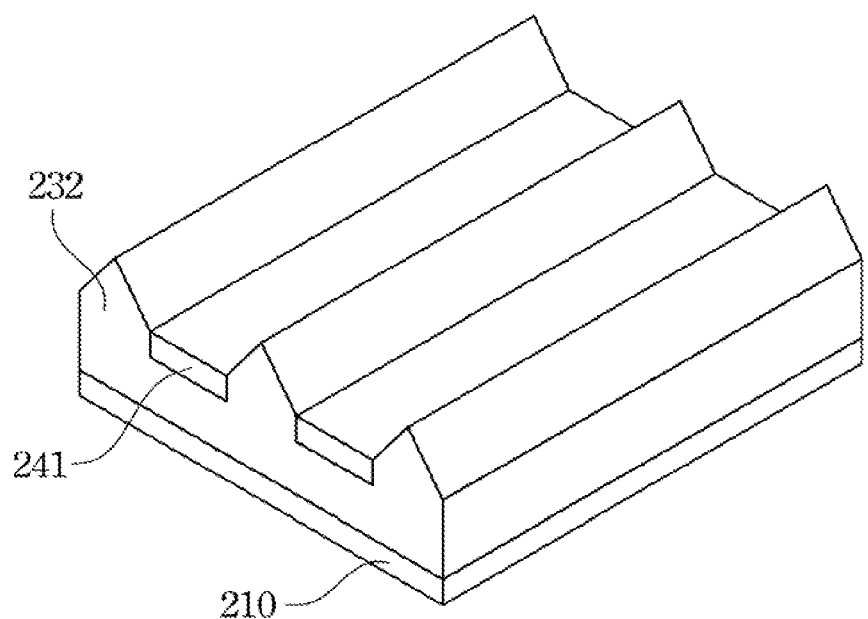

Then, as indicated in FIG. 2B, a curable resin 220 is coated on the base substrate 210. The curable resin 220 is coated by a process known to an artisan skilled in the art, such as die coating or gravure coating. The curable resin 220 is selected from the UV curable resin or thermo-curable resin, such as, for example, acrylic resin, silicone or polyurethane.

After the curable resin is coated, the curable resin is embossed with a predetermined pattern to form a patterned configuration 230 on the base substrate 210. The patterned configuration 230 comprises a plurality of first regions 231 and a plurality of second regions 232. The top surface of the second regions is formed with at least one inclined plane 232c (shown in FIG. 2C-1) or consisted of two inclined planes 232a and 232b (shown in FIG. 2C), wherein the angle of the at least one inclined plane of the top surface of the second regions with the horizontal is in the range of 5° to 15° and preferably is at 10°. The patterned configuration 230 is formed by embossing rollers or embossing device having a predetermined pattern on the surface thereof.

Figure 4:
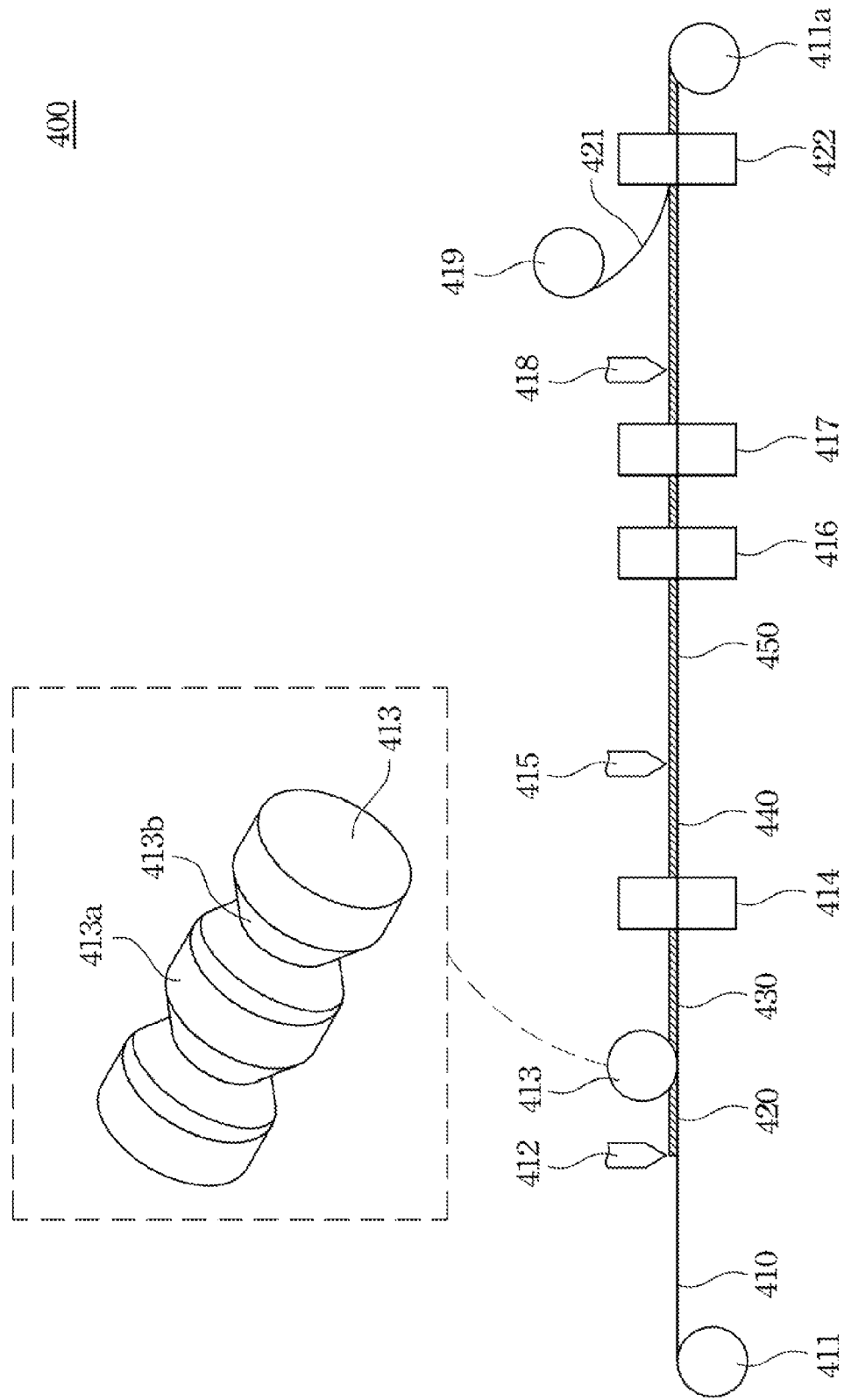
FIG. 4 shows a schematic view of a system used for manufacturing a patterned phase retardation film of an embodiment of the present invention.

Referring to FIG. 4, a diagrammatic view of a system used for manufacturing a patterned phase retardation film of an embodiment of the present invention is shown, the embossing treatment is effected by such as a grooved roller. The surface of the grooved roller 413 is set of a relief structure 413a and a grooved structure 413b, wherein the grooved structure 413b is corresponding to the inclined plane. The relief structure 413a is extended along the rotating direction of the roller 413. In another embodiment of the method of the present invention, the relief structure 413a is, arranged in a direction perpendicular to the rotating direction of the roller (not shown).

Referring to FIGS. 2A to 2E, the curable resin 220 on the base substrate 210 is passed through the grooved roller 413 to form a grating-like structures with patterned configuration 230. The patterned configuration 230 comprises a plurality of first regions 231 and a plurality of second regions 232, wherein the height and width of the grooved structure 231 and the pitch between two grooved structures 231 is determined by the pitch size of the display which the present patterned phase retardation film is adhered to, and viewing distance thereof. The height of the grooved structures 231 of the first regions is in the range of 0.1 microns to 9.9 microns. The width of the grooved structure 231 of the first regions is in the range of 10 microns to 900 microns and the pitch between two grooved structures 231 is in a range between 10 microns to 900 microns.

The patterned configuration 230 is conducting a curing treatment. The curing treatment is conducted by UV curing or thermal curing treatment. After the patterned configuration 230 is cured, the alignment layer (not shown in Drawings) is formed on the grooved structures of the first regions by a processes known in the art, such as, for example, microscratch alignment treatment, rubbing treatment, photo-alignment, $SiO_2$ evaporation and ion-beam alignment.

After the alignment layer is formed, a liquid crystal material 240 was coated on the patterned configuration 230. The coating process is also known in the art. In one embodiment of the manufacturing method of the present invention, the process for coating liquid material is, for example, by die coating or gravure coating. In another embodiment of the manufacturing method of the present invention, the liquid crystal material is polymerizable liquid crystal, such as BASF LC242 (photopolymerizable liquid crystal diacrylate, available from BASF Co., Germany.) or RMS 10-021 (available from Merck Diplay Tech Ltd, Taiwan.) The liquid crystal is mixed with solvent for conveniently coating. The solid content of the liquid crystal solution is in the range from 10% to 50%. In a preferred embodiment of the present invention, the solid content of the liquid crystal solution in the solvent is about 20%. The solvent used in the method of the present invention is known to an artisan skilled in the relevant art, such as, for example, propylene glycol monomethyl ether acetate (PGMEA).

In one embodiment of the invention, the predetermined thickness of liquid crystal material coating on the patterned configuration 230 depends on the solid content thereof. When the liquid crystal is coating on the patterned configuration, the liquid crystal can be slipped through the inclined planes 232a and 232b of the top surface of the second regions into the first regions completely. Then, the solvent in the liquid crystal is removed by heating treatment. The heating treatment is conducted at a temperature in the range between about 45° C. to about 100° C., preferably from about 50° C. to about 70° C. The thickness of the liquid crystal material after heating treatment can provide the phase retardation, for example, ½λ. The coated thickness of the liquid crystal material which depends on the properties of the polymerizable liquid crystal materials used, such as the phase retardation thereof provided. The relationship between the properties of the liquid crystal and the phase retardation thereof provided is well known to any artisan skilled in the art. In the embodiment of the method of the present invention is using the polymerizable liquid crystal material such as BASF LC242 and Merck RMS 10-021. After the solvent is removed from the liquid crystal, the phase retardation layer is formed on the grooved structure of the first regions 231.

In another embodiment of manufacturing method of the invention, liquid crystal can be solvent free and then coated on the patterned configuration 230. Due to the inclined plane of top surface of second regions, the liquid crystal can be slipped through the inclined plane thereof and fell into the first regions completely. In this embodiment of the invention, coating liquid crystal material with solvent free can be conducted in pre-heating process.

According the method disclosed in the present invention, there is no liquid crystal remaining on the top surface of the second regions because of the specific structure of at least one inclined plane thererof.

Then, the liquid crystal material is aligned with the aliment layer on the first regions 231. In another embodiment of a manufacturing method of the invention, the temperature of alignment process is in the range of about 45° C. to about 65° C. and preferably in the range of about 45° C. to about 58° C.

In a preferred embodiment of a manufacturing method of the invention, the temperature of alignment process is about 55° C.

After the liquid crystal is aligned, the liquid crystal on the first regions 231 is conducted by a curing process to form a plurality of first phase retardation regions 241. The curing process is selected from the group consisting of UV radiation and heating treatment. In another embodiment of the method of the present invention using Merck RM 10-021 as the polymerizable liquid crystal material to for the first phase retardation regions 241, the thickness of the coated liquid crystal material is 2.1 microns. Because of the phase retardation of the second regions 232 is substantially 0°, the phase retardation of the first regions and the second regions are different by 180°. According the method disclosed of the invention, the specific structure of at least one inclined plane of the top surface of the second regions is provided to make no liquid crystal remain thereon for inducing crosstalk effect occurred between the first regions and the second regions.

Figure 3:
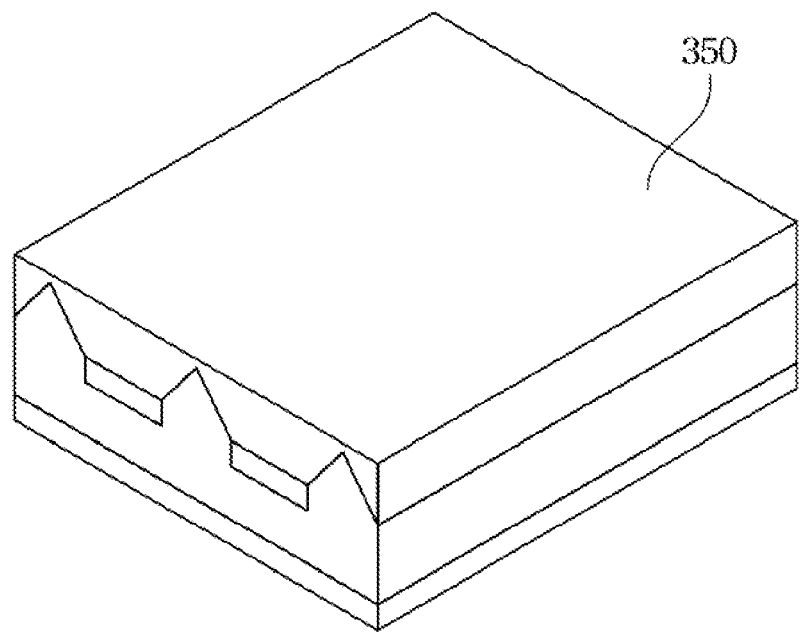
FIG. 3 shows a schematic diagram of a patterned phase retardation film of an embodiment of the present invention.

Referring to FIG. 3, the pressure sensitive adhesive is used as planarization layer for planarizing the phase retardation layer. Moreover, the pressure sensitive adhesive could not influence the optical properties of the phase retardation film, such as acrylic pressure sensitive adhesives. The reflective index of the planarization layer is the same as the curable resin of the second region. For using of the pressure sensitive adhesive as a planarization layer benefits to simply the process about laminating the patterned phase retardation film to other optical films, for example, a release film.

The method for manufacturing a patterned phase retardation film can be conducted in a batch production or a continuous production. FIG. 4 is a diagrammatic view of a system used for manufacturing a patterned phase retardation film of an embodiment of the present invention in a continuous production, such as, for example, a roll-to-roll system. The system 400 is for manufacturing the present patterned phase retardation film. The base substrate 410 is unwound from a first roller 411 and conveyed to pass through a coating means 420 to coat the curable resin thereon. Next, the curable resin is then conducted an embossing treatment via a grooved roller 413 as mentioned above, to form a patterned configuration comprising of plurality of first regions and plurality of second regions, wherein the first regions is relief structure and parallel to the second regions and the second regions comprising at least of one inclined plane. The patterned configuration 430 is then cured via curing means 414. The curing means is a UV-curing means or a thermo-curing means. In one embodiment of manufacturing method of the invention, after the patterned configuration is cured, the alignment layer is formed thereon (no shown). Then, the liquid crystal material is coating on the cured patterned configuration 440 via coating means 415.

In another embodiment of manufacturing method of the invention, the liquid crystal material solution is formed by mixing the liquid crystal and solvent and then is coated on the cured patterned configuration 440. Under a heating means 416 to remove the solvent contained in the liquid crystal coating and simultaneously align the said liquid crystal. The liquid crystal coating is heated at a temperature in a range of about 45° C. to 100° C., preferably in a range of 50° C. to 70° C. In another embodiment of manufacturing method of the invention, the liquid crystal can be solvent free and coated directly on the patterned configuration 440 via a coating means 415. The liquid crystal material is slipped through at least one inclined plane of the top surface of the second regions and fell into the first regions. After the liquid crystal is aligned, the liquid crystal is cured via a curing means 417.

The curing means 417 is a UV-curing means or a thermo-curing means. Referring to FIG. 4, after the said liquid crystal is cured, the pressure sensitive adhesive is coated on the cured liquid crystal via a pressure sensitive adhesive coating means 418. In another embodiment of the method for manufacturing a patterned phase retardation film of the present invention, the patterned phase retardation film can be laminated with another film 421, such as release film, protection film or optical films which is rewound from a second roller 419. Through a laminating means 422, the patterned phase retardation film be laminated to the pressure sensitive adhesives and sequentially wound on a roller 411a.

The present patterned phase retardation film manufactured by one embodiment of the present invention is utilized with at least one of functional optical films selected from a group consisting of hard-coating film, low reflective film, anti-reflective film and anti-glaring film on the surface of the base film opposed to the surface for forming the alignment layer in order to provide desired additional optical functionalities.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A patterned phase retardation film, comprising:
   a base substrate;
   a phase retardation layer disposed on the base substrate and having a plurality of first regions of liquid crystal material and a plurality of second regions of curable resin, wherein the first regions and the second regions are in a grating stripe structure, the first regions are substantially interlaced and parallel to the second regions, and the second regions have a top surface with at least one inclined plane; and
   a planarization layer for planarizing the phase retardation layer,
   wherein the first regions provide a first phase retardation and the second regions provide a second phase retardation, and the first phase retardation and the second phase retardation have a phase difference of 180°; and
   wherein the top surface of one of the second regions is consisted of two inclined planes and the angle of each of the inclined planes with a horizontal plane is in the range of 5° to 15°.

2. The patterned phase retardation film according to claim 1, wherein the thickness of the first region is in the range of 1 μm to 4 μm.

3. The patterned phase retardation film according to claim 1, wherein the first region further comprises an alignment layer for aligning the liquid crystal material.

4. The patterned phase retardation film according to claim 1, wherein the substrate is selected from the group consisting of polyethylene terephthalate (PET), polycarbonate (PC), triacetate cellulose (TAC), poly(methyl methacrylate) (PMMA), and cyclo-olefin polymer (COP).

5. The patterned phase retardation film according to claim 1, wherein the planarization layer is an acrylic pressure sensitive adhesive.

6. The patterned phase retardation film according to claim 1, wherein the phase retardation of the base substrate and the planarization layer are substantially 0°.

7. The patterned phase retardation film according to claim 1, wherein the planarization layer has a reflective index same as that of the curable resin of the second region.

8. The patterned phase retardation film according to claim 1, wherein the curable resin is selected from the group consisting of acrylic resin, silicone and polyurethane.

9. The patterned phase retardation film according to claim 1, wherein the patterned phase retardation film is adhered to at least one of functional optical films selected from a group consisting of a polarizing film, release film, hard-coating film, low reflective film, anti-reflective film and anti-glaring film.

* * * * *